(12) United States Patent
Bae et al.

(10) Patent No.: US 9,146,408 B2
(45) Date of Patent: Sep. 29, 2015

(54) THERMOCHROMIC WINDOW

(71) Applicant: Samsung Corning Precision Materials Co., Ltd., Gyeongsangbuk-do (KR)

(72) Inventors: Seulgi Bae, ChungCheongNam-Do (KR); Sang-Ryoun Ryu, ChungCheongNam-Do (KR); Chang Gyu Kim, ChungCheongNam-Do (KR); Hyun Bin Kim, ChungCheongNam-Do (KR); Dong-Gun Moon, ChungCheongNam-Do (KR); Young Soo Jung, ChungCheongNam-Do (KR); Yung-Jin Jung, ChungCheongNam-Do (KR); Jee Yun Cha, ChungCheongNam-Do (KR); Yong Won Choi, ChungCheongNam-Do (KR)

(73) Assignee: Corning Precision Materials Co., Ltd. (KR)

( * ) Notice: Subject to any disclaimer, the term of this patent is extended or adjusted under 35 U.S.C. 154(b) by 0 days.

(21) Appl. No.: 13/916,692

(22) Filed: Jun. 13, 2013

(65) Prior Publication Data

US 2013/0335803 A1    Dec. 19, 2013

(30) Foreign Application Priority Data

Jun. 15, 2012    (KR) .......................... 10-2012-0063992

(51) Int. Cl.
| G02F 1/01 | (2006.01) |
| G09G 3/34 | (2006.01) |
| G02F 1/00 | (2006.01) |
| C03C 17/23 | (2006.01) |
| C03C 17/34 | (2006.01) |

(52) U.S. Cl.
CPC .......... *G02F 1/0147* (2013.01); *C03C 17/3417* (2013.01); *G02F 1/009* (2013.01); *G09G 3/34* (2013.01); *C03C 17/23* (2013.01); *C03C 17/34* (2013.01); *C03C 2217/944* (2013.01)

(58) Field of Classification Search
CPC ........... G02F 1/00; G02F 1/01; G02F 1/0147; G09G 3/34; A01G 9/00; A01G 9/24; A01G 9/243; C03C 17/23; C03C 17/34; C03C 17/3417; C03C 4/00; C03C 4/08; B32B 17/10467; B32B 17/10477
USPC .................. 359/265, 275, 288, 289; 345/106; 349/16, 20, 168; 428/209, 620; 252/581; 52/171.3, 173.3, 786.1; 977/833

See application file for complete search history.

(56) References Cited

U.S. PATENT DOCUMENTS 3,829,692 A * 8/1974 Andrychuk .................. 250/330
5,524,381 A * 6/1996 Chahroudi ..................... 47/17

(Continued)

FOREIGN PATENT DOCUMENTS

| CN | 101060977 A | 10/2007 |
| EP | 2368858 A2 | 9/2011 |

(Continued)

OTHER PUBLICATIONS

Litao Kang et al: "Thermochromic properties and low emissivity of ZnO: Al/VO double-layered films with a lowered phase transition temperature", Solar Energy Materials and Solar Cells,Elsevier Science Publishers, Amsterdam,NL, vol. 95, No. 12 , Jun. 24, 2011, pp. 3189-3194, XP028307852, ISSN: 0927-0248, DOI : 10.1016/J. SOLMAT.2011.06.047 [retrived on Jul. 5, 2011].

(Continued)

*Primary Examiner* — Loha Ben
(74) *Attorney, Agent, or Firm* — Lerner, David, Littenberg, Krumholz & Mentlik, LLP

(57) ABSTRACT

A thermochromic window that can effectively insulate heat when warming is conducted in winter. The thermochromic window that includes a substrate, a thermochromic thin film formed on the substrate, and a transparent conductive film formed on at least one surface of the upper surface and the undersurface of the thermochromic thin film. The emissivity of the transparent conductive film is lower than the emissivity of the thermochromic thin film.

12 Claims, 2 Drawing Sheets

(56) References Cited

U.S. PATENT DOCUMENTS

| | | | |
|---|---|---|---|
| 5,525,430 A * | 6/1996 | Chahroudi | 428/620 |
| 6,084,702 A * | 7/2000 | Byker et al. | 359/288 |
| 6,446,402 B1 * | 9/2002 | Byker et al. | 52/173.3 |
| 8,248,683 B2 * | 8/2012 | Lee et al. | 359/288 |
| 8,422,113 B2 * | 4/2013 | Moon et al. | 359/288 |
| 8,643,795 B2 * | 2/2014 | McCarthy et al. | 349/20 |
| 8,665,414 B2 * | 3/2014 | Powers et al. | 349/168 |
| 8,908,267 B2 * | 12/2014 | McCarthy et al. | 359/352 |
| 2002/0037421 A1 | 3/2002 | Arnaud et al. | |
| 2008/0070045 A1 | 3/2008 | Barton et al. | |
| 2013/0215490 A1 * | 8/2013 | Donval et al. | 359/288 |
| 2014/0001029 A1 * | 1/2014 | Choi et al. | 204/192.1 |

FOREIGN PATENT DOCUMENTS

| | | |
|---|---|---|
| JP | 2006206398 A | 8/2006 |
| JP | 2012154969 A | 8/2012 |
| KR | 1020010029503 | 4/2001 |
| WO | 9811031 A1 | 3/1998 |

OTHER PUBLICATIONS

Granqvist et al: "Transparent conductors as solar energy materials: A panoramic review", Solar Energy Materials and Solar Cells, Elsevier Science Publishers, Amsterdam,NL, vol. 91, No. 17, Oct. 15, 2007, pp. 1529-1598, XP022206195, ISSN: 0927-0248, D0I : 10.1016 / J.SOLMAT . 2007.05.031.

Kato K et al: "Study on Thermochromic V02 Films Grown on ZN0-Coated Glass Substrates for Smart Windows", Japaness Journal of Applied Physics, The Japan Society of Applied Physics, Tokyo; JP, vol. 42, No. 10, Part 01, Oct. 1, 2003, pp. 6523-6531,XP001192338, ISSN:0021-4922, D0I : 10.1143 / JJAP.42.6523.

Qiaopiao et al., "Influence of doping on properties and development of research of vanadium dioxide", Sichuan Metallurgy, vol. 28, No. 3, Jun. 2006.

* cited by examiner

THERMOCHROMIC WINDOW

CROSS REFERENCE TO RELATED APPLICATION

The present application claims priority from Korean Patent Application Number 10-2012-0063992 filed on Jun. 15, 2012, the entire contents of which application are incorporated herein for all purposes by this reference.

BACKGROUND OF THE INVENTION

1. Field of the Invention

The present invention relates to a thermochromic window, and more particularly, to a thermochromic window, the infrared (IR) transmittance of which is adjusted depending on the temperature.

2. Description of Related Art

Thermochromism refers to the phenomenon in which an oxide or a sulfide of a transition metal undergoes a change in its crystalline structure below and above a specific temperature (i.e. its transition temperature (Tc)), whereby its physical properties (electrical conductivity and infrared (IR) transmittance) significantly change.

When a glass is coated with a thin film that has such thermochromic capability, a "smart window" can be produced, which transmits visible light but blocks near infrared (NIR) radiation and infrared (IR) radiation at or above a predetermined temperature in order to prevent the indoor temperature from increasing. The application of smart windows to vehicles or buildings may be very effective in saving energy.

Materials that exhibit thermochromism include oxides of several transition metals, of which vanadium dioxide ($VO_2$) is being widely studied since its transition temperature is 68° C., which is relatively close to the temperature at which practical application becomes possible.

When such a thermochromic thin film is applied to an architectural glass, low emissivity is required in order to minimize heat loss when warming is conducted in winter. However, the traditional thermochromic thin film does not have low emissivity, which is problematic. In particular, a vanadium dioxide ($VO_2$) thin film has a problem in that it cannot effectively insulate heat when warming is conducted in winter since it has high emissivity of 0.84 that is similar to that of typical glass.

The information disclosed in the Background of the Invention section is only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a thermochromic window that can effectively insulate heat when warming is conducted in winter.

In an aspect of the present invention, provided is a thermochromic window that includes a substrate, a thermochromic thin film formed on the substrate, and a transparent conductive film formed on at least one surface of the upper surface and the undersurface of the thermochromic thin film. The emissivity of the transparent conductive film is lower than the emissivity of the thermochromic thin film.

According to an embodiment of the present invention, the emissivity of the transparent conductive film may be 0.25 or less.

The resistivity of the transparent conductive film may be $1*10^{-3}$ Ωm or less.

The transparent conductive film may be made of one selected from the group consisting of indium tin oxide (ITO), zinc oxide (ZnO), fluorine tin oxide (FTO), aluminum-doped zinc oxide (AZO) and gallium-doped zinc oxide (GZO).

The thermochromic thin film may be implemented as one selected from the group consisting of vanadium dioxide ($VO_2$), titanium (III) oxide ($Ti_2O_3$ niobium oxide ($NbO_2$) and nickel sulfide (NiS).

The thermochromic thin film may be treated with a dopant.

The transparent conductive film may be made of aluminum-doped zinc oxide (AZO) or gallium-doped zinc oxide (GZO), and the thermochromic thin film comprises vanadium dioxide ($VO_2$).

The transparent conductive film may be formed on the undersurface of the thermochromic thin film, the aluminum-doped zinc oxide (AZO) or the gallium-doped zinc oxide (GZO) being grown in a (001) direction.

The thickness of the transparent conductive film may range from 350 to 650 nm.

The amount of the Al in the aluminum-doped zinc oxide (AZO) may range from 3 to 5 weight parts per 100 weight parts of the aluminum-doped zinc oxide (AZO).

The amount of Ga in the gallium-doped zinc oxide (GZO) may range from 3.5 to 5.5 weight parts per 100 weight parts of the gallium-doped zinc oxide (GZO).

The thermochromic thin film may be treated with a dopant.

The dopant may be at least one selected from the group consisting of Mo, W, Cr, Ni and Zr.

According to embodiments of the present invention, the thermochromic window can effectively insulate heat when warming is conducted in winter since it has low emissivity.

In addition, the phase transition performance of the thermochromic thin film made of $VO_2$ can be improved, since the $VO_2$ thermochromic thin film is formed on the transparent conductive film made of AZO or GZO that is grown in the (001) direction.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
FIG. 1 is a cross-sectional view schematically showing a thermochromic window according to an embodiment of the present invention.

Reference will now be made in detail to a thermochromic window according to the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

FIG. 1 is a cross-sectional view schematically showing a thermochromic window according to an embodiment of the present invention.

Referring to FIG. 1, the thermochromic window according to this embodiment of the present invention includes a substrate 100, a thermochromic thin film 200 and a transparent conductive film 300.

The substrate 100 is a base material for the thermochromic thin film 200 or a transparent conductive film 300. It is preferred that the substrate 100 be implemented as soda-lime architectural glass.

The thermochromic thin film 200 is formed on the substrate 100. The thermochromic thin film 200 undergoes a change in the crystalline structure due to the thermochromic phenomenon in which its phase transits at a specific temperature (i.e. its phase transition temperature), whereby its physical properties (electrical conductivity and infrared (IR) transmittance) significantly change, thereby blocking or reflecting infrared (IR) radiation at or above a predetermined temperature.

The thermochromic thin film 200 can be made of one selected from among, but not limited to, vanadium dioxide ($VO_2$), titanium (III) oxide ($Ti_2O_3$), niobium oxide ($NbO_2$) and nickel sulfide (NiS).

The thermochromic thin film 200 can be treated with a dopant in order to lower the phase transition temperature.

The phase transition temperature significantly decreases as the doping ratio of the dopant becomes higher. The thermochromic thin film 200 can be doped by sputtering a thermochromic material using a target which is treated with the dopant, or co-sputtering a target made of a thermochromic material and a target made of the dopant.

The transparent conductive oxide film or transparent conductive film 300 is formed on at least one surface of the upper surface or the undersurface of the thermochromic thin film 200, thereby lowering the emissivity of the thermochromic window.

Since the emissivity of the transparent conductive film 300 is lower than that of the thermochromic thin film, it is possible to lower the overall emissivity of the thermochromic window by forming the transparent conductive film 300 on at least one surface of the upper surface or the undersurface of the thermochromic thin film 200.

It is preferred that the transparent conductive film 300 be formed on the undersurface of the thermochromic thin film 200 in order to act as a diffusion barrier that prevents ions inside the substrate 100 from diffusing into the thermochromic thin film 200 in the process in which the thermochromic thin film 200 is deposited, thereby preventing the thermochromic thin film 200 from losing its thermochromic characteristic. In particular, when the substrate 100 is implemented as a soda-lime glass substrate, the transparent conductive film 300 can prevent sodium (Na) ions inside the glass substrate from diffusing into the thermochromic thin film 200.

Here, the transparent conductive film 300 can be made of one selected from among, but not limited to, indium tin oxide (ITO), zinc oxide (ZnO), fluorine tin oxide (FTO), aluminum-doped zinc oxide (AZO) and gallium-doped zinc oxide (GZO).

The emissivity of the transparent conductive film 300 can have a variety of values depending on the properties of components of the transparent conductive film and the conditions under which the transparent conductive film is deposited.

Figure 2:
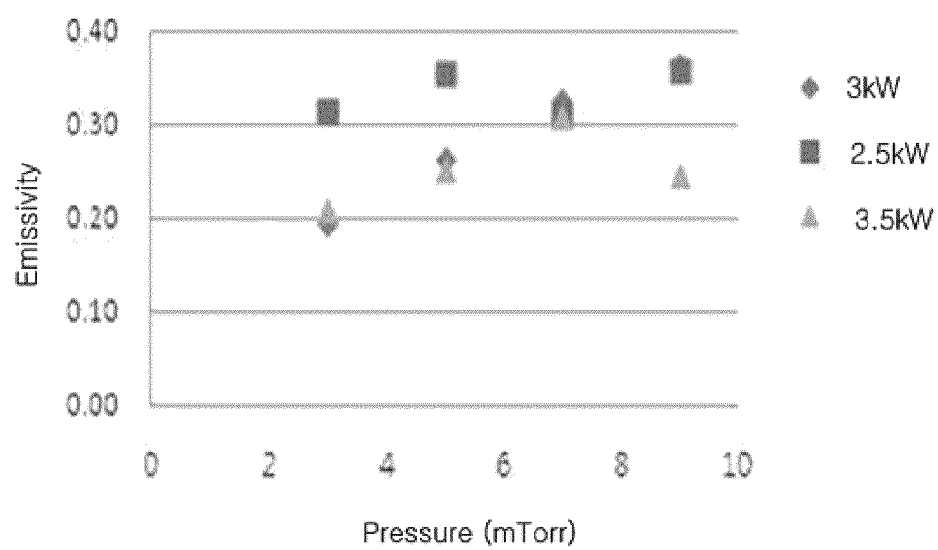
FIG. 2 is a graph showing variations in the emissivity of AZO depending on variations in pressure and power from among deposition conditions for AZO thin films.

FIG. 2 is a graph showing variations in the emissivity of AZO depending on variations in pressure and power from among deposition conditions for AZO thin films.

As shown in FIG. 2, the emissivity of the transparent thin film can be adjusted by controlling conditions under which the transparent thin film is deposited.

It is preferred that the transparent conductive film 300 have an emissivity of 0.25 or lower or a resistivity of $1*10^{-3}$ $\Omega$cm or less.

As described above, the thermochromic window according to this embodiment of the present invention has a low emissivity since it includes the substrate 100, the thermochromic thin film 200 and the transparent conductive film 300. This increases the reflectivity to long-wavelength infrared (IR) radiation (2500 to 4000 nm), thereby lowering the shading coefficient. Accordingly, the thermochromic window can minimize any loss in heat when warming is conducted in winter.

Figure 3:
FIG. 3 is a cross-sectional view schematically showing a thermochromic window according to another embodiment of the present invention.

Reference will now be made to a thermochromic window according to another embodiment of the present invention with reference to FIG. 3.

The thermochromic window according to this embodiment of the present invention includes a substrate 100, a thermochromic thin film 210 which is formed on the substrate 100 and is made of $VO_2$, and a transparent conductive film 310 which is formed on at least one surface of the upper surface or the undersurface of the thermochromic thin film 210 and is made of aluminum-doped zinc oxide (AZO) or gallium-doped zinc oxide (GZO).

It is preferred that the transparent conductive film 310 be formed on the undersurface of the thermochromic thin film 210, in which the AZO or GZO of the transparent conductive film 310 is grown in the (001) direction.

Since the transparent conductive film 310 is formed on the undersurface of the thermochromic thin film 210 with the AZO or GZO of the transparent conductive film 310 being grown in the (001) direction, the transparent conductive film 310 acts as a diffusion barrier and a seed layer of the thermochromic thin film 210 made of $VO_2$.

Since the transparent conductive film 310 is positioned between the substrate 100 and the thermochromic thin film 210, the transparent conductive film 310 prevents ions inside the substrate 100 from diffusing into thermochromic thin film 210, as described above. In addition, since the transparent conductive film 310 is made of AZO or GZO, which is grown in the (001) direction and melds well with the $VO_2$ of the thermochromic thin film 210, and $VO_2$ is grown on the transparent conductive film 310, $VO_2$ is grown in the (010) direction having superior phase transition performance.

It is preferred that the thickness of the transparent conductive film 310 range from 350 to 650 nm.

In addition, it is preferred that the amount of Al in the AZO range from 3 to 5 weight parts per 100 weight parts of the AZO and that the amount of Ga in the GZO range from 3.5 to 5.5 weight parts per 100 weight parts of the GZO.

Figure 4:
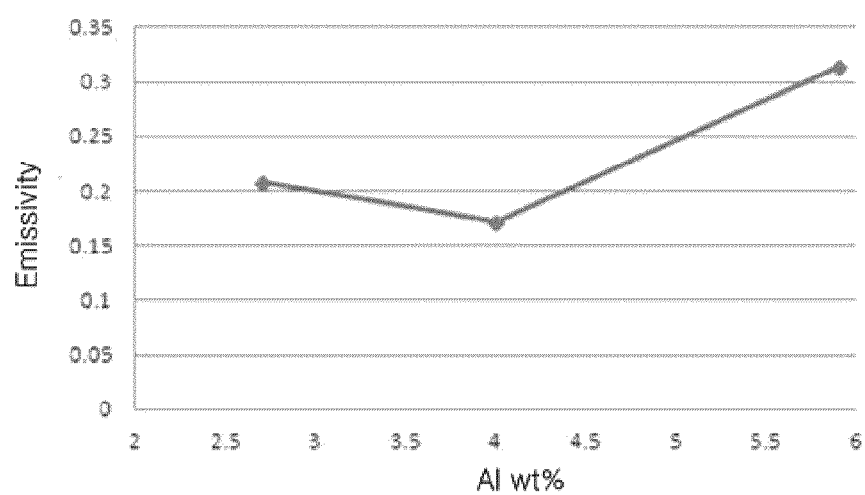
FIG. 4 is a graph showing the emissivity of AZO thin films depending on the Al concentrations in the AZO thin films.

FIG. 4 is a graph showing the emissivity of AZO thin films depending on the Al concentrations in the AZO thin films.

As shown in FIG. 4, since the AZO is doped with 3 to 5 weight parts of Al, the AZO has an emissivity ranging from 0.17 to 0.25.

In addition, the thermochromic thin film 210 made of VO$_2$ as described above may be treated with a dopant in order to lower the phase transition temperature.

Here, the dopant may be at least one selected from among, but not limited to, Mo, W, Cr, Ni and Zr.

The foregoing descriptions of specific exemplary embodiments of the present invention have been presented with respect to the certain embodiments and drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A thermochromic window comprising:
    a substrate;
    a transparent conductive film deposited on the substrate, wherein a resistivity of the transparent conductive film is $1*10^{-3}$ Ωm or less; and
    a thermochromic thin film deposited on the transparent conductive film such that the transparent conductive thin film and the thermochromic thin film are sequentially formed on the substrate,
    wherein an emissivity of the transparent conductive film is lower than an emissivity of the thermochromic thin film.

2. The thermochromic window of claim 1, wherein the emissivity of the transparent conductive film is 0.25 or less.

3. The thermochromic window of claim 1, wherein the transparent conductive film comprises one selected from the group consisting of indium tin oxide (ITO), zinc oxide (ZnO), fluorine tin oxide (FTO), aluminum-doped zinc oxide (AZO) and gallium-doped zinc oxide (GZO).

4. The thermochromic window of claim 1, wherein the thermochromic thin film comprises one selected from the group consisting of vanadium dioxide (VO$_2$), titanium (III) oxide (Ti$_2$O$_3$), niobium oxide (NbO$_2$) and nickel sulfide (NiS).

5. The thermochromic window of claim 1, wherein the thermochromic thin film is treated with a dopant.

6. The thermochromic window of claim 1, wherein the transparent conductive film comprises aluminum-doped zinc oxide (AZO) or gallium-doped zinc oxide (GZO), and the thermochromic thin film comprises vanadium dioxide (VO$_2$).

7. The thermochromic window of claim 6, wherein the aluminum-doped zinc oxide (AZO) or gallium-doped zinc oxide (GZO) is grown in a (001) direction.

8. The thermochromic window of claim 6, wherein a thickness of the transparent conductive film ranges from 350 to 650 nm.

9. The thermochromic window of claim 6, wherein an amount of the Al in the aluminum-doped zinc oxide (AZO) ranges from 3 to 5 weight parts per 100 weight parts of the aluminum-doped zinc oxide (AZO).

10. The thermochromic window of claim 6, wherein an amount of the Ga in the gallium-doped zinc oxide (GZO) ranges from 3.5 to 5.5 weight parts per 100 weight parts of the gallium-doped zinc oxide (GZO).

11. The thermochromic window of claim 6, wherein the thermochromic thin film is treated with a dopant.

12. The thermochromic window of claim 11, wherein the dopant comprises at least one selected from the group consisting of Mo, W, Cr, Ni and Zr.

* * * * *